(12) United States Patent
McCuller

(10) Patent No.: US 7,805,488 B2
(45) Date of Patent: Sep. 28, 2010

(54) DETERMINING SOCIAL ACTIVITY PROFILE OF A PARTICIPANT IN A COMMUNICATION NETWORK

(75) Inventor: Patrick McCuller, San Diego, CA (US)

(73) Assignee: Sony Online Entertainment LLC, San Diego, CA (US)

(*) Notice: Subject to any disclaimer, the term of this patent is extended or adjusted under 35 U.S.C. 154(b) by 316 days.

(21) Appl. No.: 11/381,971

(22) Filed: May 5, 2006

(65) Prior Publication Data

US 2007/0269783 A1 Nov. 22, 2007

(51) Int. Cl.
*G06F 15/16* (2006.01)
(52) U.S. Cl. .................. 709/206; 709/207; 715/736
(58) Field of Classification Search .......... 709/205, 709/206
See application file for complete search history.

(56) References Cited

U.S. PATENT DOCUMENTS

| | | |
|---|---|---|
| 6,832,245 B1 | 12/2004 | Isaacs et al. |
| 7,174,516 B2 * | 2/2007 | Chipchase ............ 715/763 |
| 7,319,745 B1 * | 1/2008 | Firestone ............ 379/202.01 |
| 2005/0165920 A1 * | 7/2005 | Kerr et al. ............ 709/223 |
| 2006/0080422 A1 * | 4/2006 | Huberman et al. ...... 709/223 |
| 2007/0168446 A1 * | 7/2007 | Keohane et al. ........ 709/207 |

OTHER PUBLICATIONS

International Search Report/ Written Opinion issued in PCT/US07/67807 on Jul. 24, 2008.
International Preliminary Report on Patentability as issued in International Patent Application No. PCT/US2007/067807 on Nov. 20, 2008.

* cited by examiner

*Primary Examiner*—Vivek Srivastava
*Assistant Examiner*—Ryan J Jakovac
(74) *Attorney, Agent, or Firm*—Samuel S. Lee; Procopio, Cory, Hargreaves & Savitch LLP

(57) ABSTRACT

Determining the extent of a personal network and/or social activity of a participant in a communication network. On method includes: representing contacts between the participant and communication partners of the participant as a time sequence order; determining an instant strength value over time using the representation of contacts as a time sequence order; and charting a direction of the extent of the personal network and/or social activity of the participant by monitoring a change in the instant strength value over time.

28 Claims, 7 Drawing Sheets

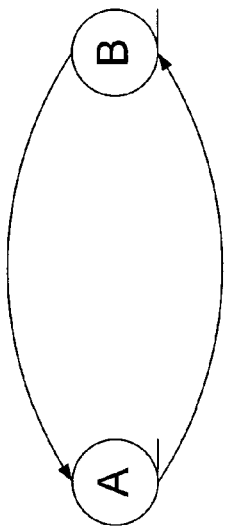
FIG. 1
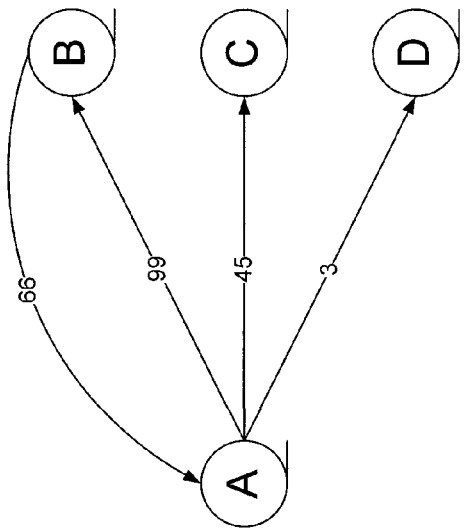
FIG. 2
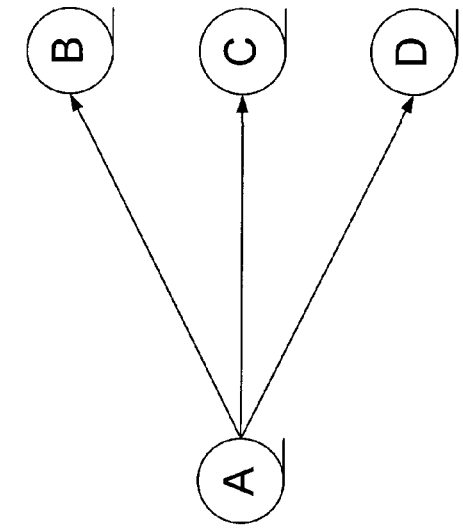
FIG. 4
FIG. 3

DETERMINING SOCIAL ACTIVITY PROFILE OF A PARTICIPANT IN A COMMUNICATION NETWORK

CROSS-REFERENCE TO RELATED APPLICATIONS

This application is related to U.S. patent application Ser. No. 11/381,975, entitled "Determining Influential/Popular Players in a Communication Network", filed concurrently with this application and hereby incorporated by reference.

BACKGROUND

The present invention relates to a communication network, and more specifically, to determining a personal network/social activity profile of a participant in such a communication network.

In a typical communication network application, a participant may be engaged in a social activity with communication partners. Generally, the extent of the participant's engagement in the activity of the network can be defined by the strength of interactions between the participant and the communication partners as well as their "connectedness" to the rest of the communication network. Moreover, the structure of the communication network changes continuously. Accordingly, understanding the evolution of the communication network over time is more important than understanding it at an instant.

Conventional methods of analyzing a communication or social network focus on network snapshots, where substantial portion of network information is assumed to exist at a moment or over a fixed period of time. Thus, these network snapshots provide no particular sensitivity to the order and structure of the network over time that resulted in the "end state" of the network.

SUMMARY

Implementations of the present invention provide methods, systems, apparatus, and programs for determining the extent of a personal network and/or social activity of a participant in a communication network.

In one implementation, the method includes: representing contacts between the participant and communication partners of the participant as a time sequence order; determining an instant strength value over time using the representation of contacts as a time sequence order; and charting a direction of the extent of the personal network and/or social activity of the participant by monitoring a change in the instant strength value over time.

In another implementation, the system includes: a contact representation unit configured to represent contacts between the participant and communication partners of the participant as a time sequence order; a personal network extent determination unit configured to determine an instant strength value over time using the representation of contacts as a time sequence order represented by said contact representation unit; and a charting unit configured to chart a direction of the extent of the personal network and/or social activity of the participant by monitoring a change in said instant strength value over time.

BRIEF DESCRIPTION OF THE DRAWINGS

FIG. 1 shows a message path from Player A to Player B illustrated as a link.

FIG. 2 shows two separate links representing two-way paths between Player A and Player B.

FIG. 3 shows a one-to-three link setup with three message paths from Player A to each of Players B, C, and D.

FIG. 4 is an example of a communication network illustrating Player A in communication link with communication partners B, C, and D.

DETAILED DESCRIPTION

Implementations of the present invention provide methods, systems, and programs for determining the extent of a personal network/social activity of an actor/player/participant in a communication network, such as an online game. In one implementation, the extent of the personal network/social activity is defined by the "interconnectedness" of the player in the communication network.

FIGS. 1 through 4 illustrate terms used in connection with determining the extent of a personal network/social activity of an actor/player/participant (hereinafter referred to as a "player") in a communication network. For example, a player, while playing a game online, communicates with other players using "emotes" or "body gestures" to express emotions or horseplay. The player can also use messaging to communicate with other players by sending discreet text packets or notes. Thus, each message has an Origin player and one or more Destination player(s), forming a distinct message path.

A message path or part of a message path that connects two players, in one direction, is referred to as a link. FIG. 1 shows a message path from Player A to Player B illustrated as a link. A link can be two-directional, or two separate links can represent two-way paths. FIG. 2 shows two separate links representing two-way paths between Player A and Player B. FIG. 3 shows a one-to-three link setup with three message paths from Player A to each of Players B, C, and D.

Over a period of time, message paths are re-used by a player. Thus, a player may send new messages to one or more communication partner(s) to whom the player has sent prior messages. In one embodiment, the transmission of messages from a player to a communication partner may be noted by attaching a number to the link. For example, a number attached to the link may start at one and be incremented by one for each time the path is re-used. This number is referred to as strength of the link. FIG. 4 is an example of a communication network illustrating Player A in communication link with communication partners B, C, and D. Each link in the communication network of FIG. 4 includes a strength number corresponding to each link.

Generally, features provided in the implementations of the present invention can include, but are not limited to, one or more of the following.

Figure 5:
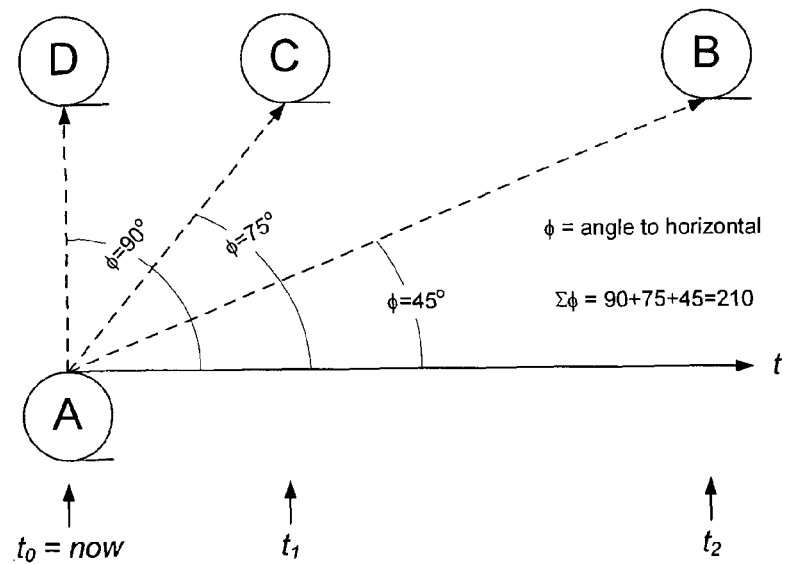
FIG. 5 shows first contacts between Player A and communication partners B, C, and D in a communication network represented as a time sequence order in a positive t direction.

In one implementation illustrated in FIG. 5, a first plurality of contacts between a player (e.g., Player A) and communication partners (e.g., Players B, C, and D) of the player in a communication network are represented as a time sequence order in a first direction (e.g., positive t direction). For example, in FIG. 5, the time sequence order refers to the arrangement of communication partners D, C, and B from left to right with "most recent" and/or "most frequent" contact communication partner D at the left above Player A ($t_0$) and "least recent" and/or "least frequent" contact communication partner B at the right ($t_2$). Therefore, the representation of a partner further away from the origin ($t_0$) in the first direction indicates contacts made more distant in the past. Accordingly, in this example, when lines are drawn to represent contacts between Player A and communication partners B, C, and D, and angles are formed by these lines and the horizontal, the representation of more recent and/or frequent contacts (e.g., between A and D at to) is illustrated as a larger angle (e.g., 90°) than that of older and/or less frequent contacts (e.g., 45°between A and B at $t_2$). The frequency and/or recency of contacts between Player A and communication partner C is older and/or less frequent than between A and D but is more recent and/or frequent than between A and B (i.e., at $t_1$). In the illustrated example of FIG. 5, angles formed between Player A and communication partners B, C, and D are 45°, 75°, and 90°, respectively.

Figure 6:
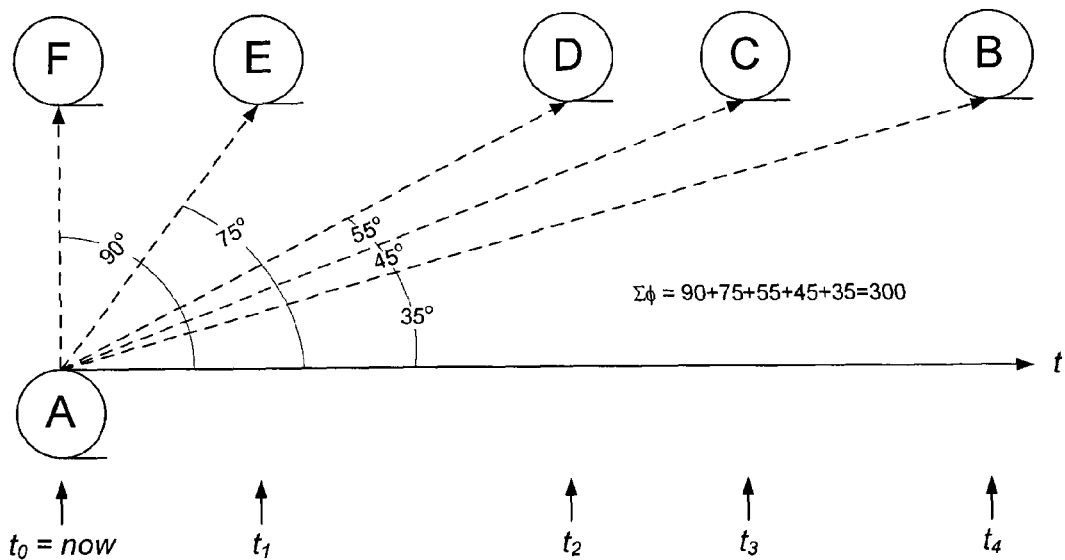
FIG. 6 is a graphical representation of Player A's contacts with its communication partners at a particular time later than that of FIG. 5 representation.

FIG. 6 is a graphical representation of a player's contacts with its communication partners at a particular time later than that of FIG. 5 representation. In FIG. 6, contacts between a player (e.g., Player A) and communication partners (e.g., Players B, C, D, E, and F) of the player over time without any communication are represented as an adjustment to the time sequence order in the same direction as the first direction (i.e., positive t direction). For example, in FIG. 6, when no additional recent and/or frequent contacts are established between Player A and communication partners B, C, and D, the positions of communication partners B, C, and D are moved to the right in accordance with time. Therefore, the time sequence positions of communication partners B, C, and D are moved from $t_2$, $t_1$, $t_0$, respectively, in FIG. 5, to $t_4$, $t_3$, $t_2$, respectively, in FIG. 6.

Further, by adjusting the time sequence order of communication partners B, C, and D, the angles formed between Player A and communication partners B, C, and D are also adjusted from 45°, 75°, and 90°, respectively, in FIG. 5, to 35°, 45°, and 55°, respectively, in FIG. 6. Thus, as time passes without any communication contacts between a player and communication partners, angles formed by the contact lines between the player and the communication partners decrease respectively. In FIG. 6, contact lines between Player A and newly-established communication partners E and F form angles 75° and 90°, respectively.

Figure 7:
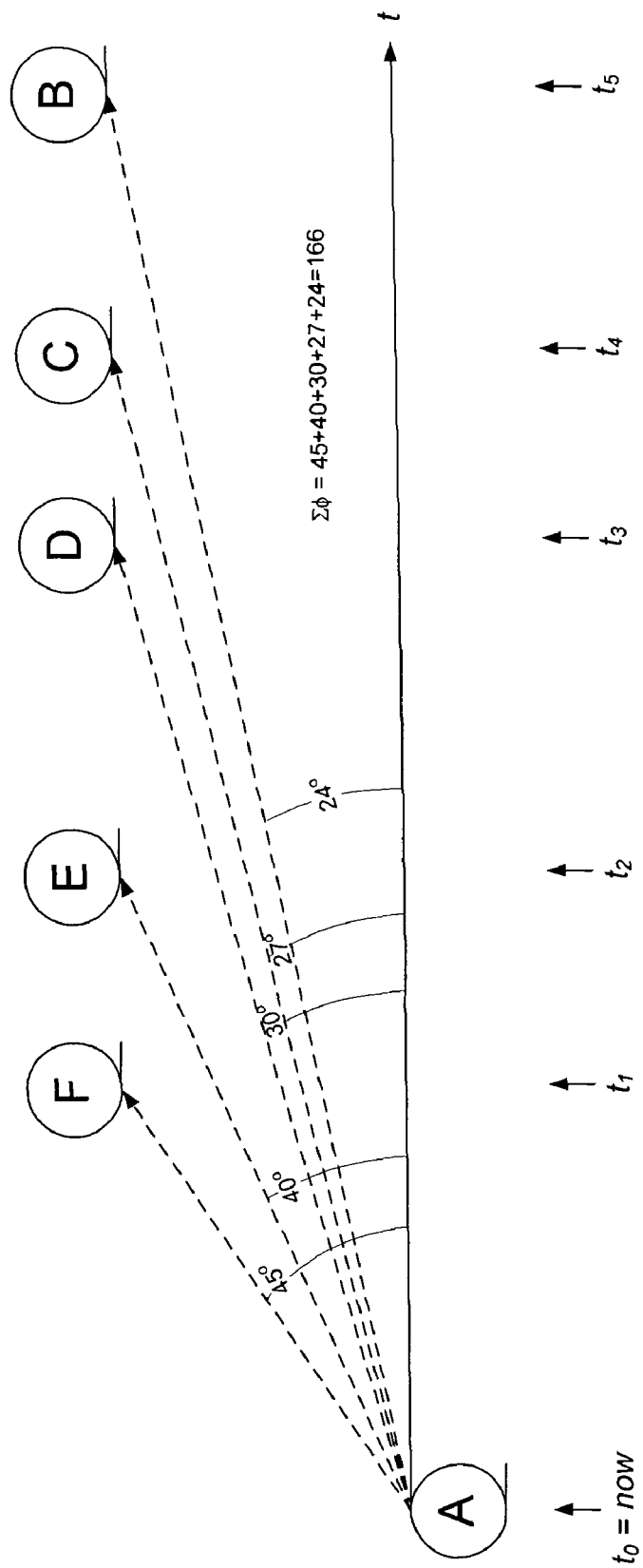
FIG. 7 is a graphical representation of Player A's contacts with its communication partners at a particular time later than that of FIG. 6 representation.

FIG. 7 illustrates one implementation of a graphical representation of a player's contacts with its communication partners at a particular time later than that of FIG. 6 representation. In FIG. 7, since there were no additional recent and/or frequent contacts established between Player A and communication partners B, C, D, E, and F, the positions of communication partners B, C, D, E, and F are moved to the right in accordance with time. Therefore, the time sequence positions of communication partners B, C, D, E, and F are moved from $t_4$, $t_3$, $t_2$, $t_1$, $t_0$, respectively, in FIG. 6, to $t_5$, $t_4$, $t_3$, $t_2$, $t_1$, respectively, in FIG. 7. Further, by adjusting the time sequence order of communication partners B, C, D, E, and F, the angles formed between Player A and communication partners B, C, D, E, and F are also adjusted from 35°, 45°, 55°, 75°, and 90°, respectively, in FIG. 6, to 24°, 27°, 30°, 40°, and 45°, respectively, in FIG. 7.

Figure 8:
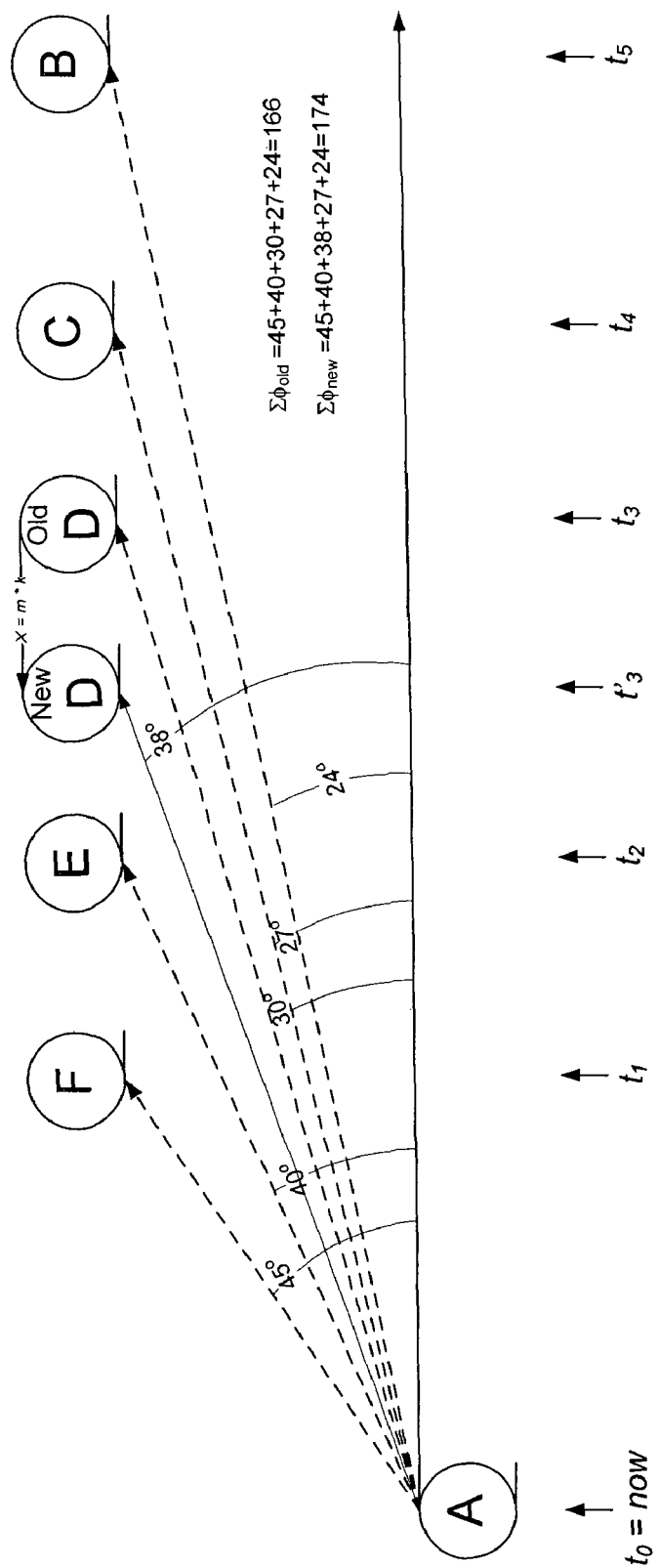
FIG. 8 is a graphical representation of Player A's contacts with its communication partners at a substantially same time as that of FIG. 7 representation but with additional recent and/or frequent contacts between Player A and communication partner D.

FIG. 8 is a graphical representation of a player's contacts with its communication partners at a substantially same time as that of FIG. 7 representation. However, in FIG. 8, additional recent and/or frequent contacts between Player A and communication partner D in the communication network are established. Accordingly, these additional recent and/or frequent contacts are represented as an adjustment to the time sequence order in a second direction (i.e., negative t direction) opposite to the first direction. Thus, in the illustrated example of FIG. 8, when additional recent and/or frequent contacts are established between Player A and communication partner D, the position of communication partner D is moved to the left in accordance with the recentness and/or frequency of the contact. Accordingly, the time sequence position of communication partner D is moved from $t_3$ to $t'_3$. Further, by adjusting the time sequence order of communication partner D, the angle formed between Player A and communication partner D is also adjusted from 30° to 38°.

In one embodiment, the amount of the adjustment (x) to the time sequence order in the second direction is a function of both the frequency and the recency of the contacts between the player and its communication partner. In the illustrated implementation of FIG. 8, the frequency of the contacts (i.e., the frequency factor) between Player A and communication partner D is represented by a number of messages (m) sent between the two participants. In another embodiment, the frequency factor is represented by a link strength of the communication link between the two participants (see FIG. 4). The recency of the contacts between Player A and communication partner D is represented by a recency factor (k). Thus, the more recent the messages sent between the two participants, the higher the value of the recency factor k. The amount of the adjustment (x) is then calculated as a product (x=m*k) of the frequency factor and the recency factor. In the illustrated embodiment, the amount of the adjustment in the second direction opposite to the first direction is limited to being directly above the player at 90° from the horizontal.

Figure 9:
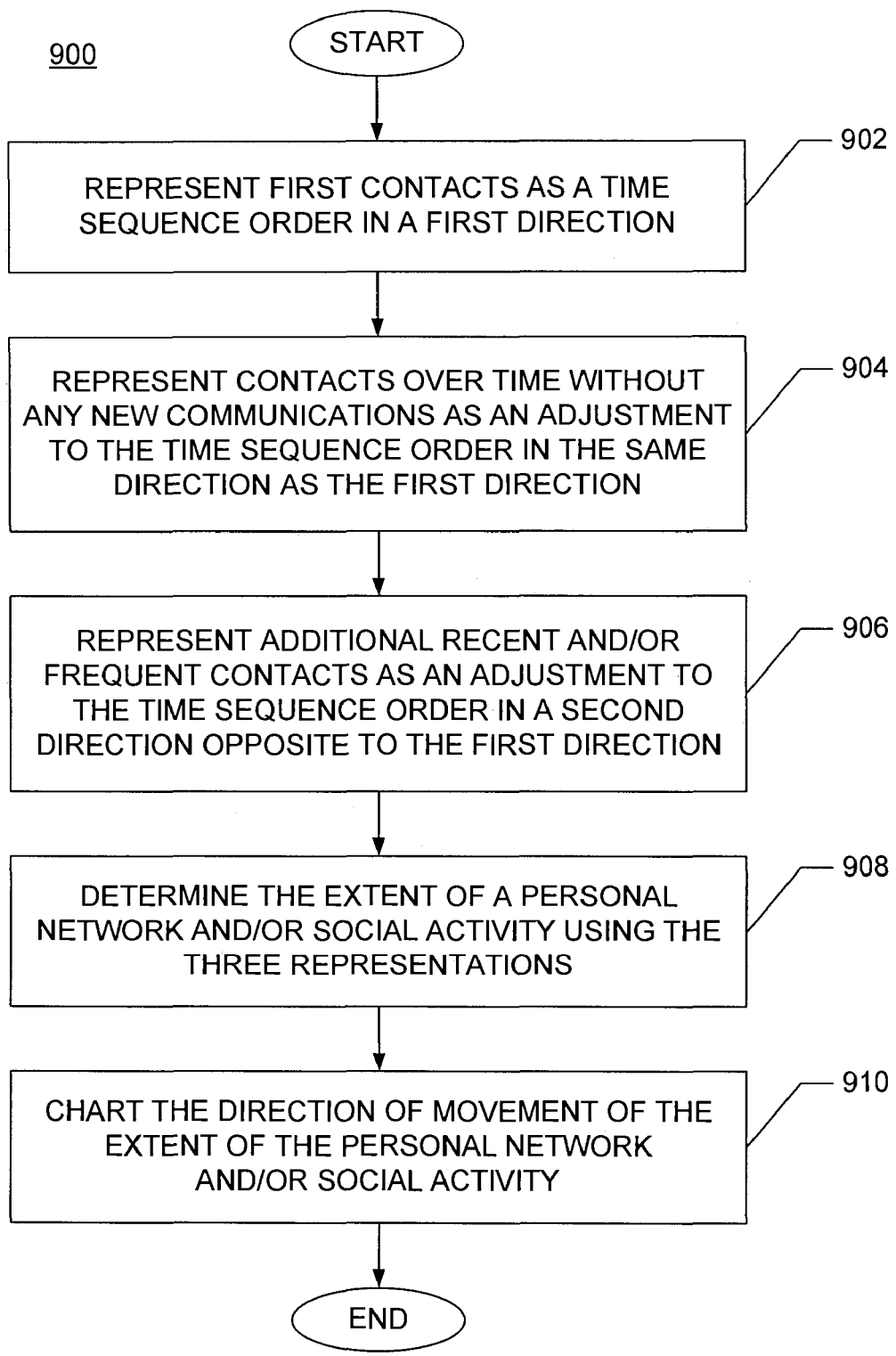
FIG. 9 is a summary flowchart for determining the extent of a personal network/social activity of an actor/player in a communication network.

FIG. 9 shows a summary flowchart 900 for determining the extent of a personal network/social activity of a player in a communication network. Initially, first contacts between a player (e.g., Player A in FIGS. 5 through 8) and communication partners are represented, at 902, as a time sequence order in a first direction. At 904, contacts between the player and the communication partners over time without any new communication are represented as an adjustment to the time sequence order in the same direction as the first direction. Additional recent and/or frequent contacts between the player and the communication partners are represented, at 906, as an adjustment to the time sequence order in a second direction opposite to the first direction. In one embodiment, the amount of the adjustment to the time sequence order in the second direction is a function of both the frequency and the recency of the contacts between the player and its communication partner.

Using these representations 902, 904, 906, illustrated and described in FIGS. 5 through 8, the extent of a personal network/social activity of a player in a communication network can be determined, at 908.

For example, in one implementation, the extent of a personal network/social activity of a player can be determined by initially determining an "instant strength" value by summing all the angles between the player and the communication partners. Thus, at an instant shown in FIG. 5, the instant strength value is calculated to be 210 while the instant strength value at an instant shown in FIG. 6 is calculated to be 300. The value is increased because although Player A's angles to communication partners B, C, and D has decreased due to lack of additional communications with those communication partners, Player A has established other recent and/or frequent contacts with new communication partners E and F. FIG. 7 illustrates same contact relationships as FIG. 6 between Player A and communication partners B, C, D, E, and F. However, the instant of FIG. 7 shows older and/or less frequent contacts between Player A and communication partners B, C, D, E, and F. Therefore, the instant strength value (i.e., 166) at an instant shown in FIG. 7 is substantially less than the value (i.e., 300) at an instant shown in FIG. 6. When additional recent and/or frequent contacts between Player A and communication partner D occur, as shown in FIG. 8, an adjustment to the time sequence order is made from left to right increasing the angle between Player A and communication partner D. This increases the instant strength value from 166 to 174. Accordingly, the change in the instant strength value over time represents the extent of a personal network/social activity of a player in a communication network.

Finally, the direction of the extent of the player's personal network and/or social activity can be charted, at 910, by monitoring the change in the instant strength value over time. That is, by analyzing the components of the communication network of a player and communication partners, over time, a player's social activity can be characterized as growing or diminishing.

In one example, the information obtained by determining the extent of the player's personal network and/or social activity, as described above, can be used to identify whose personal networks are sparse and whose networks are rich, and how the networks are changing over time. Thus, the information can be used to answer questions such as "is a given player gaining or losing friends" and "is the player keeping up with old friends and/or making new ones". The information can also be used to identify "influential" players in a communication network. Further, the information can be applied toward modeling the future behavior and toward the goals of strengthening individual and overall communication network cohesion.

In other examples, the obtained information can be beneficially applied in personal service businesses such as "matchmaking" services. These goals can also be beneficial to communication network providers and other related entities.

Figure 10A:
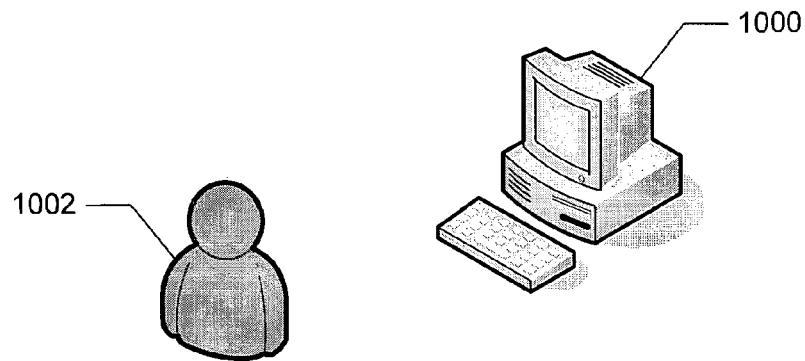
FIG. 10A shows a representation of a computer system and a user.

FIG. 10A shows a representation of a computer system 1000 and a user 1002. The user 1002 can use the computer system 1000 to determine the extent of a personal network/social activity of a player in a communication network. In one example, a computer system stores and executes a contact representation application program. The contact representation program 1012 is designed to (1) represent first contacts between a player and communication partners as a time sequence order in a first direction; (2) represent contacts between the player and the communication partners over time without any new communication as an adjustment to the time sequence order in the same direction as the first direction; and (3) represent additional recent and/or frequent contacts between the player and the communication partners as an adjustment to the time sequence order in a second direction opposite to the first direction.

Figure 10B:
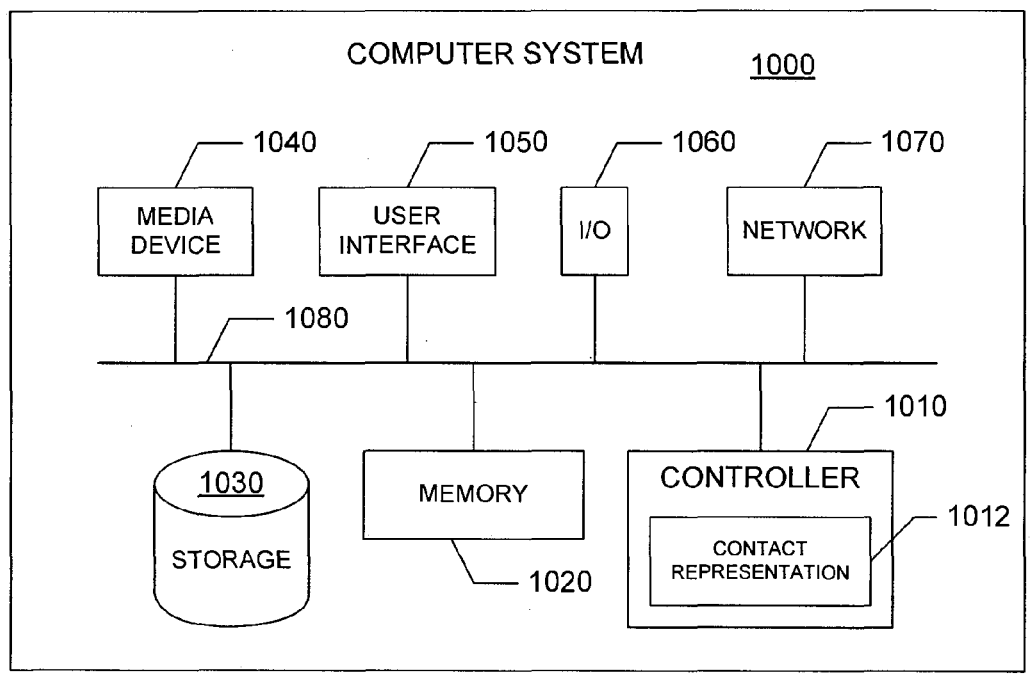
FIG. 10B is a block diagram of one implementation of the computer system in FIG. 10A, including a contact representation program.

FIG. 10B shows a block diagram of one implementation of the computer system 1000 in FIG. 10A, including a contact representation program. The computer system 1000 includes a controller 1010, a memory 1020, storage 1030, a media device 1040, a user interface 1050, an input/output (I/O) interface 1060, and a network interface 1070. These components are interconnected by a common bus 1080. Alternatively, different connection configurations can be used, such as a star pattern with the controller at the center.

The controller 1010 is a programmable processor and controls the operation of the computer system 1000 and its components. The controller 1010 loads instructions from the memory 1020 or an embedded controller memory (not shown) and executes these instructions to control the system. In its execution, the controller 1010 provides the contact representation program as a software system. Alternatively, this service can be implemented as separate components in the controller 1010 or the computer system 1000.

Memory 1020 stores data temporarily for use by the other components of the computer system 800. In one implementation, memory 1020 is implemented as RAM. In one implementation, memory 1020 also includes long-term or permanent memory, such as flash memory and/or ROM.

Storage 1030 stores data temporarily or long term for use by the other components of the computer system 1000, such as for storing contact representations calculated by the contact representation program 1012. In one implementation, storage 1030 is a hard disk drive.

The media device 1040 receives removable media and reads and/or writes data to the inserted media. In one implementation, the media device 1040 is an optical disc drive.

The user interface 1050 includes components for accepting user input from a user of the computer system 1000 and presenting information to the user. In one implementation, the user interface 1050 includes a keyboard, a mouse, audio speakers, and a display. The controller 1010 uses input from the user to adjust the operation of the computer system 1000.

The I/O interface 1060 includes one or more I/O ports to connect to corresponding I/O devices, such as external storage or supplemental devices (e.g., a printer or a PDA). In one implementation, the ports of the I/O interface 1060 include ports such as: USB ports, PCMCIA ports, serial ports, and/or parallel ports. In another implementation, the I/O interface 1060 includes a wireless interface for communication with external devices wirelessly.

The network interface 1070 includes a wired and/or wireless network connection, such as an RJ-45 or "Wi-Fi" interface (802.11) supporting an Ethernet connection.

The computer system 1000 includes additional hardware and software typical of computer systems (e.g., power, cooling, operating system), though these components are not specifically shown in FIG. 10B for simplicity. In other implementations, different configurations of the computer system can be used (e.g., different bus or storage configurations or a multi-processor configuration).

Figure 11:
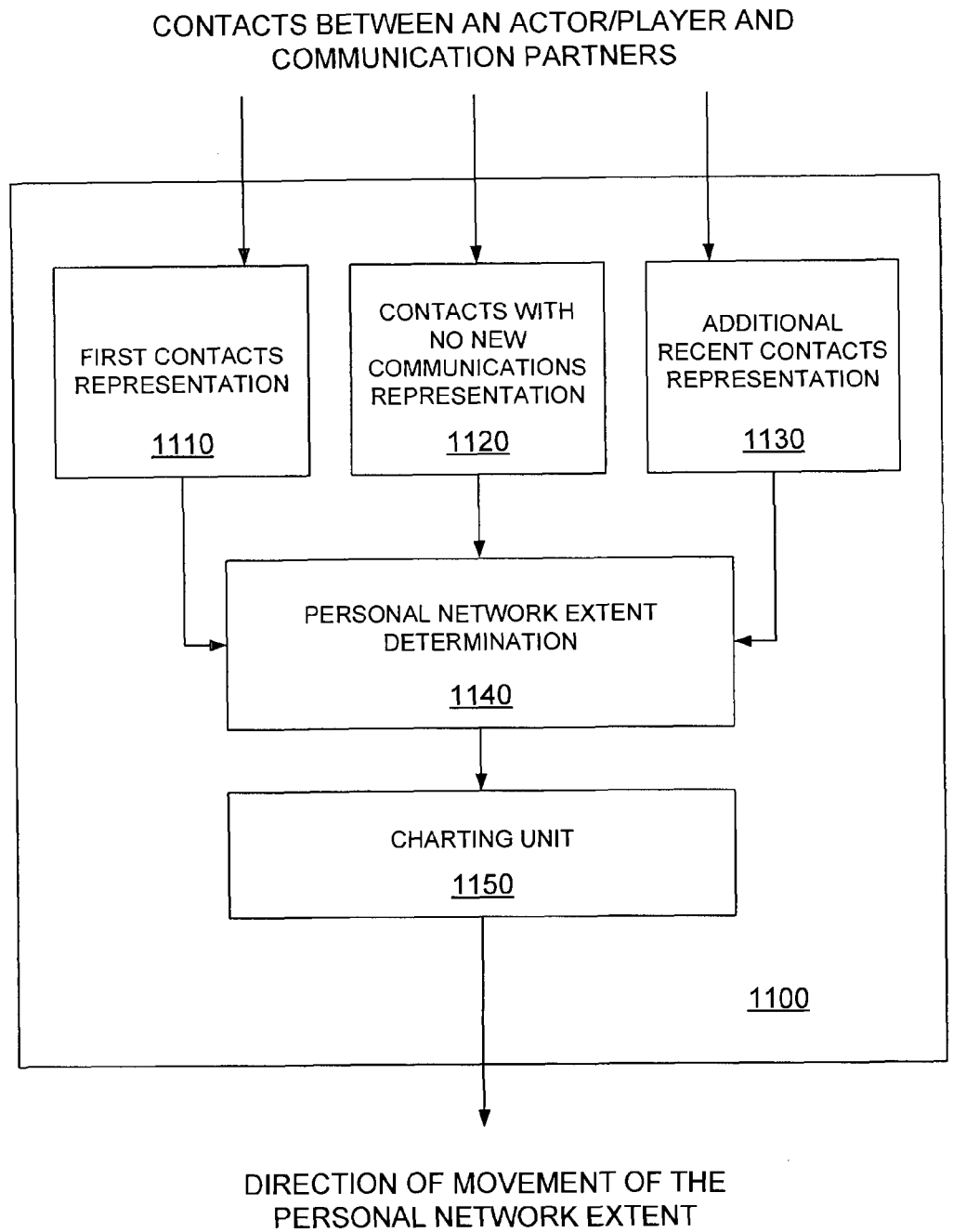
FIG. 11 is a block diagram of a system for determining the extent of a personal network/social activity of an actor/player in a communication network, such as an online game.

FIG. 11 shows a block diagram of a system 1100 for determining the extent of a personal network/social activity of a player in a communication network, such as an online game. The system 1100 includes a "first contacts" representation unit 1110, a "contacts with no new communications" representation unit 1120, an "additional recent contacts" representation unit 1130, a personal network extent determination unit 1140, and a charting unit 1150.

The "first contacts" representation unit 1110 is configured to receive data regarding first contacts between a player and communication partners and to represent the data as a time sequence order in a first direction. The "contacts with no new communications" representation unit 1120 is configured to receive data regarding contacts between the player and the communication partners over time without any new communication and to represent the data as an adjustment to the time sequence order in the same direction as the first direction. The "additional recent contacts" representation unit 1130 is configured to receive data regarding additional recent and/or frequent contacts between the player and the communication partners and to represent the data as an adjustment to the time sequence order in a second direction opposite to the first direction.

Using these representations generated by units 1110, 1120, 1130, the personal network extent determination unit 1140 determines the extent of a personal network/social activity of a player in a communication network. In one implementation, the extent of the personal network/social activity of a player is determined by initially determining an "instant strength" value by summing all the angles between the player and the communication partners. The personal network extent can be estimated by processing the change in the instant strength value over time. Finally, the charting unit 1150 characterizes the player's personal network/social activity as growing or diminishing by monitoring the change in the instant strength value over time.

Various implementations of the invention are realized in electronic hardware, computer software, or combinations of these technologies. Some implementations include one or more computer programs executed by a programmable processor or computer. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description refers to using the sum of the angles to determine the extent of the personal network/social activity of a player, other parameters, such as temporal distances (e.g., $t_1$, $t_2$, $t_3$, $t_4$) can be used to determine the extent. Accordingly, the present invention is not limited to only those implementations described above.

What is claimed is:

1. A computer-implemented method for determining the extent of a personal network and/or social activity of a participant in a communication network, comprising:

graphically representing contacts between the participant and communication partners of the participant as a graph of a time sequence order on a display, wherein the time sequence order is an order in the arrangement of the communication partners, and wherein angular separations in the graph between the participant and the communication partners vary in proportion to the time sequence order;

determining an instant strength value over time that shows an extent of a personal network and/or social activity of the participant using the representation of the contacts as a time sequence order; and charting a direction of the extent of the personal network and/or social activity of the participant by monitoring a change in said instant strength value over time, wherein the change in the instant strength value is calculated when an adjustment is made to the time sequence order in a second direction opposite to the first direction.

2. The method of claim 1, wherein said representing contacts includes representing first contacts between the participant and the communication partners as a time sequence order in a first direction.

3. The method of claim 1, wherein said representing contacts includes representing contacts between the participant and the communication partners over time without any new communication as an adjustment to said time sequence order in the same direction as the first direction.

4. The method of claim 1, wherein said adjustment to said time sequence order in a second direction is a product of a frequency factor and a recency factor.

5. The method of claim 4, wherein the frequency factor includes a number of messages sent between the participant and a communication partner.

6. The method of claim 4, wherein the frequency factor includes a link strength of a communication link between the participant and a communication partner.

7. The method of claim 1, wherein said representing contacts includes determining angles formed by contact lines between the participant and the communication partners.

8. The method of claim 7, wherein said instant strength value is determined by summing said angles formed by contact lines between the participant and the communication partners at a particular instant of time.

9. The method of claim 8, wherein said charting a direction includes reviewing said instant strength value over time; and characterizing the personal network and/or social activity of the participant as growing or diminishing based on said review.

10. A computer-implemented system for determining the extent of a personal network and/or social activity of a participant in a communication network, comprising:

a contact representation unit configured to graphically represent contacts between the participant and communication partners of the participant as a graph of a time sequence order on a display, wherein the time sequence order is an order in the arrangement of the communication partners, and wherein angular separations in the graph between the participant and the communication partners vary in proportion to the time sequence order;

a personal network extent determination unit configured to determine an instant strength value over time that shows an extent of a personal network and/or social activity of the participant using the representation of the contacts as a time sequence order represented by said contact representation unit; and a charting unit configured to chart a direction of the extent of the personal network and/or social activity of the participant by monitoring a change in said instant strength value over time, wherein the change in the instant strength value is calculated when an adjustment is made to the time sequence order in a second direction opposite to the first direction.

11. The system of claim 10, wherein said contact representation unit includes a first unit to represent first contacts between the participant and the communication partners as a time sequence order in a first direction.

12. The system of claim 10, wherein said contact representation unit includes a second unit to represent contacts between the participant and the communication partners over time without any new communication as an adjustment to said time sequence order in the same direction as the first direction.

13. The system of claim 10, wherein said adjustment to said time sequence order in a second direction is a product of a frequency factor and a recency factor.

14. The system of claim 13, wherein the frequency factor includes a number of messages sent between the participant and a communication partner.

15. The system of claim 13, wherein the frequency factor includes a link strength of a communication link between the participant and a communication partner.

16. The system of claim 10, wherein said contact representation unit includes an angle determining unit to determine angles formed by contact lines between the participant and the communication partners.

17. The system of claim 16, wherein said contact representation unit further includes a summing unit to sum said angles formed by contact lines between the participant and the communication partners at a particular instant of time.

18. The system of claim 10, wherein said charting unit includes a first unit to review said instant strength value over time; and a second unit to characterize the personal network and/or social activity of the participant as wowing or diminishing based on said review.

19. A non-transitory computer-readable storage medium, for determining the extent of a personal network and/or social activity of a participant in a communication network, comprising executable instructions that cause a computer to:

graphically represent contacts between the participant and communication partners of the participant as a graph of a time sequence order, wherein the time sequence order is an order in the arrangement of the communication partners, and wherein angular separations in the graph between the participant and the communication partners vary in proportion to the time sequence order;

determine an instant strength value over time that shows an extent of a personal network and/or social activity of the participant using the representation of the contacts as a time sequence order; and chart a direction of the extent of the personal network and/or social activity of the participant by monitoring a change in said instant strength value over time, wherein the change in the instant strength value is calculated when an adjustment is made to the time sequence order in a second direction opposite to the first direction.

20. The non-transitory computer-readable storage medium of claim 19, wherein executable instructions that cause a computer to represent contacts includes executable instructions that cause a computer to:

represent first contacts between the participant and the communication partners as a time sequence order in a first direction.

21. The non-transitory computer-readable storage medium of claim 19, wherein executable instructions that cause a computer to represent contacts includes executable instructions that cause a computer to:

represent contacts between the participant and the communication partners over time without any new communication as an adjustment to said time sequence order in the same direction as the first direction.

22. The non-transitory computer-readable storage medium of claim 19, wherein executable instructions that cause a computer to represent contacts includes executable instructions that cause a computer to:

determine angles formed by contact lines between the participant and the communication partners.

23. The non-transitory computer-readable storage medium of claim 22, wherein executable instructions that cause a computer to determine instant strength value includes executable instructions that cause a computer to:

sum said angles formed by contact lines between the participant and the communication partners at a particular instant of time.

24. The non-transitory computer-readable storage medium of claim 23, wherein executable instructions that cause a computer to chart a direction includes executable instructions that cause a computer to:

review said instant strength value over time; and characterize the personal network and/or social activity of the participant as growing or diminishing based on said review.

25. A computer-implemented apparatus for determining the extent of a personal network and/or social activity of a participant in a communication network, comprising:

means for graphically representing contacts between the participant and communication partners of the participant as a graph of a time sequence order on a display, wherein the time sequence order is an order in the arrangement of the communication partners, and wherein angular separations in the graph between the participant and the communication partners vary in proportion to the time sequence order;

means for determining an instant strength value over time that shows an extent of a personal network and/or social activity of the participant using the representation of the contacts as a time sequence order; and means for charting a direction of the extent of the personal network and/or social activity of the participant by monitoring a change in said instant strength value over time, wherein the change in the instant strength value is calculated when an adjustment is made to the time sequence order in a second direction opposite to the first direction.

26. The method of claim 1, wherein said representing contacts includes graphically representing, on a graph having a first axis and a second axis, first contacts between the participant and the communication partners as a time sequence order in a first direction along the first axis.

27. The method of claim 1, wherein said representing contacts includes graphically representing, on a graph having a first axis and a second axis, additional recent and/or frequent contacts between the participant and the communication partners as an adjustment to said time sequence order in a second direction opposite to the first direction along the first axis.

28. The method of claim 1, wherein the angular separations in the graph increase in proportion to the time sequence order.

* * * * *